(12) United States Patent
Wada (10) Patent No.: US 7,061,937 B1
(45) Date of Patent: Jun. 13, 2006

(54) COMMUNICATION SYSTEM (75) Inventor: Naoyuki Wada, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 965 days.

(21) Appl. No.: 09/658,759

(22) Filed: Sep. 8, 2000

(30) Foreign Application Priority Data

Nov. 30, 1999 (JP) .................................. 11-340490

(51) Int. Cl.
*H04J 1/00* (2006.01)

(52) U.S. Cl. ........................ 370/487; 370/488; 725/39; 725/100; 725/140

(58) Field of Classification Search ........ 370/486–488, 370/490, 497, 492, 498, 535, 442, 437, 337, 370/347; 725/61, 63–64, 39–47, 68, 91, 725/97–98, 100–101, 103–104, 120, 131, 725/139, 151, 86–87, 140
See application file for complete search history.

(56) References Cited

U.S. PATENT DOCUMENTS

| | | | | |
|---|---|---|---|---|
| 4,450,477 A | * | 5/1984 | Lovett | 725/93 |
| 5,126,840 A | * | 6/1992 | Dufresne et al. | 725/125 |
| 5,473,609 A | * | 12/1995 | Chaney | 370/312 |
| 5,559,548 A | * | 9/1996 | Davis et al. | 725/40 |
| 5,870,395 A | * | 2/1999 | Baran | 370/395.1 |
| 6,052,145 A | * | 4/2000 | Macrae et al. | 725/50 |
| 6,075,972 A | * | 6/2000 | Laubach et al. | 455/3.05 |
| 6,205,485 B1 | * | 3/2001 | Kikinis | 709/231 |
| 6,226,794 B1 | * | 5/2001 | Anderson et al. | 725/131 |
| 6,401,242 B1 | * | 6/2002 | Eyer et al. | 725/35 |
| 6,414,720 B1 | * | 7/2002 | Tsukidate et al. | 348/469 |
| 6,438,752 B1 | * | 8/2002 | McClard | 725/46 |
| 6,453,473 B1 | * | 9/2002 | Watson, Jr. | 725/120 |
| 6,625,810 B1 | * | 9/2003 | Murphy et al. | 725/39 |

\* cited by examiner

*Primary Examiner*—Ricky Q. Ngo
*Assistant Examiner*—Nittaya Juntima
(74) *Attorney, Agent, or Firm*—Finnegan, Henderson, Farabow, Garrett & Dunner, L.L.P.

(57) ABSTRACT

A transmission schedule table of program data to be transmitted from a video server to a client is previously transmitted to a filter unit. The filter unit receives program information concerning a currently received program, from the client. Based on a transmission schedule table and program information, the filter unit filters program data multiplexed on the basis of frequency and time, which is transmitted from the video server, while changing its own filtering characteristic. The filter unit transmits the filtered data to the client.

3 Claims, 8 Drawing Sheets

PRIOR ART

EXAMPLE OF TIME SCHEDULE FOR UPSTREAM USING ONE FREQUENCY
(THE NUMBERS WITHIN SCHEDULE INDICATE TIME ASSIGNED TO
RESPECTIVE CLIENTS)

FIG. 14A

OPERATION EXAMPLE OF FILTER 0
(ON : PASS DATA    OFF : INTERRUPT DATA)

FIG. 14B

OPERATION EXAMPLE OF FILTER 1
(ON : PASS DATA    OFF : INTERRUPT DATA)

FIG. 14C

EXAMPLE OF TIME SCHEDULE FOR UPSTREAM USING TWO TYPES OF FREQUENCIES
(THE NUMBERS WITHIN SCHEDULE INDICATE TIME ASSIGNED TO RESPECTIVE CLIENTS)

FIG. 15A

OPERATION EXAMPLE OF FILTER 0
(ON:PASS DATA   OFF:INTERRUPT DATA)

FIG. 15B

OPERATION EXAMPLE OF FILTER 1
(ON:PASS DATA   OFF:INTERRUPT DATA)

FIG. 15C

| TIME SLOT 0 | TIME SLOT 1 | TIME SLOT 2 | TIME SLOT 3 | TIME SLOT 4 |
|---|---|---|---|---|

FIG. 16

COMMUNICATION SYSTEM

CROSS-REFERENCE TO RELATED APPLICATIONS

This application is based upon and claims the benefit of priority from the prior Japanese Patent Application No. 11-340490, filed Nov. 30, 1999, the entire contents of which are incorporated herein by reference.

BACKGROUND OF THE INVENTION

The present invention relates to a communication system for making communication using videos, sounds, and electronic data, wherein a band range of the transmission line is multiplexed by means of multiplex techniques such as frequency multiplex, time multiplex, and the like.

Normally, in case of an RF (Radio Frequency) signal, data is kept transmitted continuously like TV and radio broadcasting. In the receiver side, a tuner is synchronized with a characteristic frequency to receive the signal. Therefore, if other data than the signal exists in the frequency range, this data is received as normal data and causes noise. For example, in case of TV broadcasting, a ghost appears due to a reflected wave which is received after a delay.

In a technique which has already been established, video and audio data is subjected to A/D conversion, compressed according to MPEG, modulated in a method of QPSK, QAM, or the like, and transmitted on an RF signal. Therefore, the band range necessary for one channel is small. In general, however, a plurality of programs are transmitted within a band range of one channel in order to maintain compatibility with existing systems.

In this case, to receive a particular channel, tuning is set to the frequency of the channel of a program and data is demodulated. Thereafter, only particular data is filtered from a plurality of channels, based on an ID which the data has, and the data is D/A-converted. Thus, a particular program can be received and viewed/listened.

Figure 1:
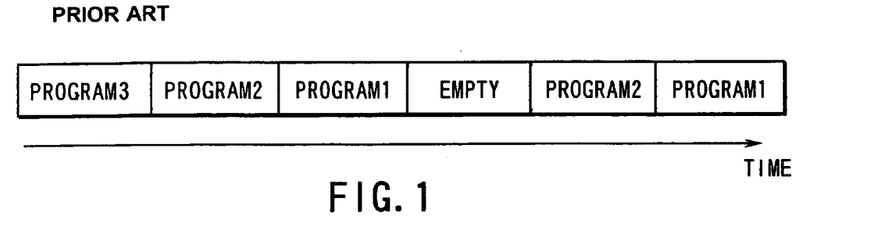
FIG. 1 is a view showing a state where a plurality of programs are compressed into one channel and transferred.

That is, as shown in FIG. 1, a plurality of programs can be multiplexed on one same channel at one same frequency, by adopting time-sharing in which multiplex is made in the time axis direction.

However, it is impossible to know the timing when the data to be received is transmitted, even tuning is set to a target frequency. Therefore, it is necessary to keep continuously receiving data, so that even a signal delayed due to reflection or so is received and causes a factor of deterioration of receiving performance.

BRIEF SUMMARY OF THE INVENTION

An object of the present invention is to provide a communication system in which the data transmitting side previously notifies a filter unit of a timing of data to be transmitted and the data receiving side notifies the filter unit of which program data to receive, so that only target data can be extracted at the previously notified timing in the side of the filter unit.

To achieve the above object, a communication system according to the present invention comprises: a transmitting apparatus for sending program data multiplexed based on frequency and time and for transmitting a schedule table indicating a schedule of data to be transmitted to a receiving apparatus, in an RF communication network connected with a transmitting apparatus and a receiving apparatus, in which the program data is transmitted and received; a receiving apparatus for transmitting receiving information indicating which program is being viewed/listened; and a filter unit which changes a filtering characteristic of itself based on the schedule table received from the transmitting apparatus and the receiving information received from the receiving apparatus, such that only data specified by the receiving information is transmitted to the receiving apparatus among the multiplexed program data.

In the structure thus constructed, the side of the filter unit previously knows which program is transmitted at which timing in which frequency band. Therefore, the filter unit can extract notified target data from the side of the receiving apparatus and can transfer it to the receiving apparatus. As a result, data need not be kept received continuously. Accordingly, it is possible to remove a problem of noise caused by receiving data other than a target signal, as normal data. Unlike a conventional system, program data need not be A/D-converted to discriminate ID (Identification Data) attached to program data in order to extract particular program data from a plurality of programs, so the processing steps are simplified.

Another communication system according to the present invention comprises: a first transmitting/receiving apparatus for transmitting multiplexed program data to be transmitted from the first transmitting/receiving apparatus to a second transmitting/receiving apparatus, first transfer schedule table information indicating a schedule of the program data, and second transfer schedule table information concerning data to be transmitted from the second transmitting/receiving apparatus to the first transmitting/receiving apparatus, to filter means; the second transmitting/receiving apparatus for transmitting data to the first transmitting/receiving apparatus, based on the second transfer schedule table information transmitted from the first transmitting/receiving apparatus; and a filter unit for receiving the first transfer schedule table information and the second transfer schedule table information transmitted from the first transmitting/receiving apparatus, for filtering data transmitted from the first transmitting/receiving apparatus, based on the first transfer schedule table information, and for filtering data transmitted from the second transmitting/receiving apparatus to the first transmitting/receiving apparatus, based on the second transfer schedule table information.

In the structure thus constructed, the characteristic of the filter unit is changed based on time information indicating when a program is broadcasted, a band frequency at which program data is transmitted, and information concerning a program. Therefore, noise can be prevented from entering into terminals. Also, even when a plurality of program data items are supplied within a band range of one channel by compressing the data according to MPEG or the like, data other than the data of the program which the receiving apparatus is receiving can be interrupted. As a result, it is possible to exclude a signal which enters within the same channel but at a timing other than a regular timing due to reflection or the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of a communication system according to the present invention will be explained with reference to the drawings.

Figure 2:
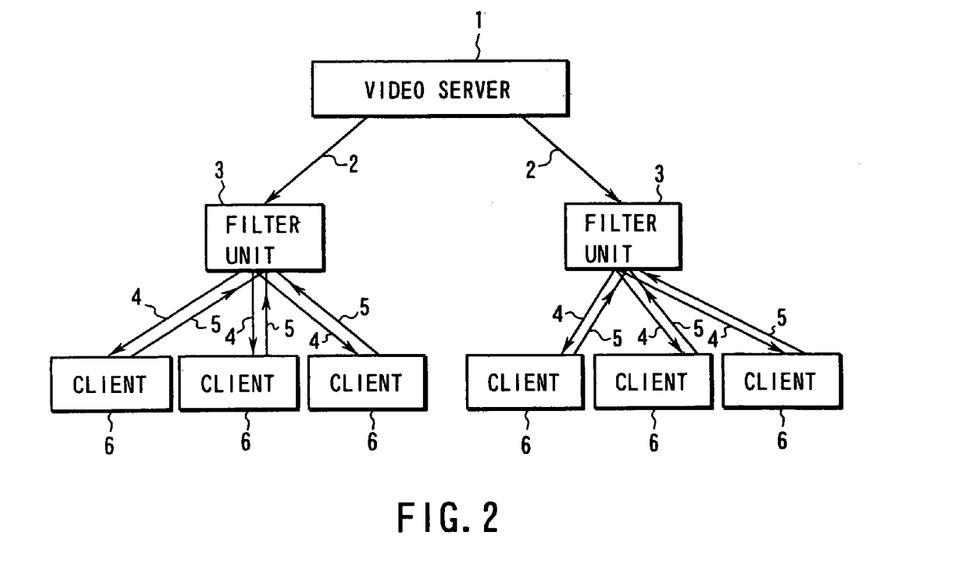
FIG. 2 is a block diagram showing a video server system as an embodiment of a communication system according to the present invention.

FIG. 2 is a block diagram showing a video server system as an embodiment of the communication system according to the present invention. As shown in the figure, the video server 1 which functions as a head end is connected with filter units 3 through transmission lines 2 constructed by RF cables, CATV networks, or the like. Each filter unit 3 is connected with a plurality of clients 6 through upstream transmission lines 5 and downstream transmission lines 4. To simplify this figure, only two filter units are shown although any given number of filter units can be connected. Also, any given number of clients can be connected to each filter unit. Between the video server 1 and each filter unit 3, data can be transmitted in one single direction, i.e., in the direction from the side of the video server 1 to the side of the filter units 3. Meanwhile, bi-directional transmission is possible between each filter unit and each client. The communication networks between the video server 1 and the filter units may be symmetrical communication networks (e.g., LAN (Local Area Network) or the like) or may have an asymmetrical structure. In case of an asymmetrical structure, the frequency band of the downstream transmission line may be enlarged while the frequency band of the upstream transmission line may be reduced. Otherwise, the downstream transmission line may be constructed by an RF network while the upstream transmission line may be constructed by a telephone line network. Otherwise, the communication networks may be asymmetrical like a LAN and a telephone line network, or a wireless network and a LAN, etc. Also, each client may be constructed by a personal computer connected to a set-top box or a network through Ethernet or the like.

The video server 1 sends, in addition to program data to be transmitted essentially, a schedule table for transmitting program data for controlling the filter units 3, to the filter units 3 through the transmission lines 2. Also, the clients 6 send program information which they are currently receiving, to the filter units 3 through the upstream transmission lines 5. The filter units 3 perform filtering operation while changing its characteristics, based on the schedule table supplied from the video server 1 and the program information supplied from the clients 6. The video server 1 further transfers program data after the filtering operation, to the clients 6.

Figure 3:
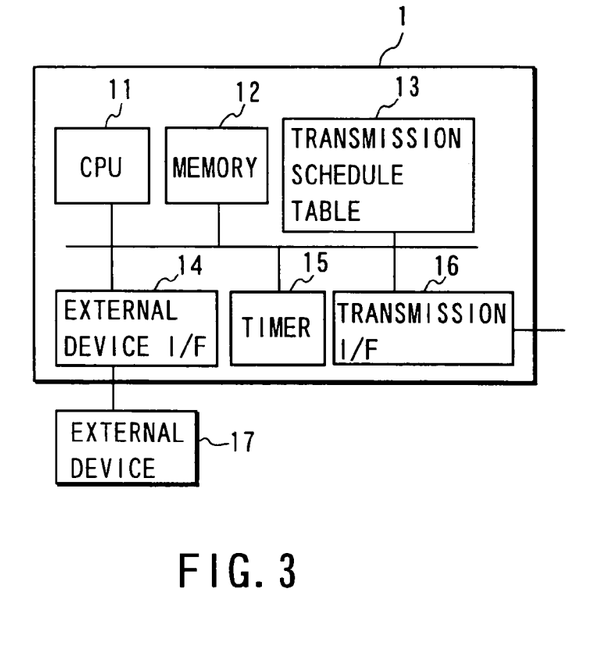
FIG. 3 is a block diagram showing details of a video server shown in FIG. 2.
Figure 4:
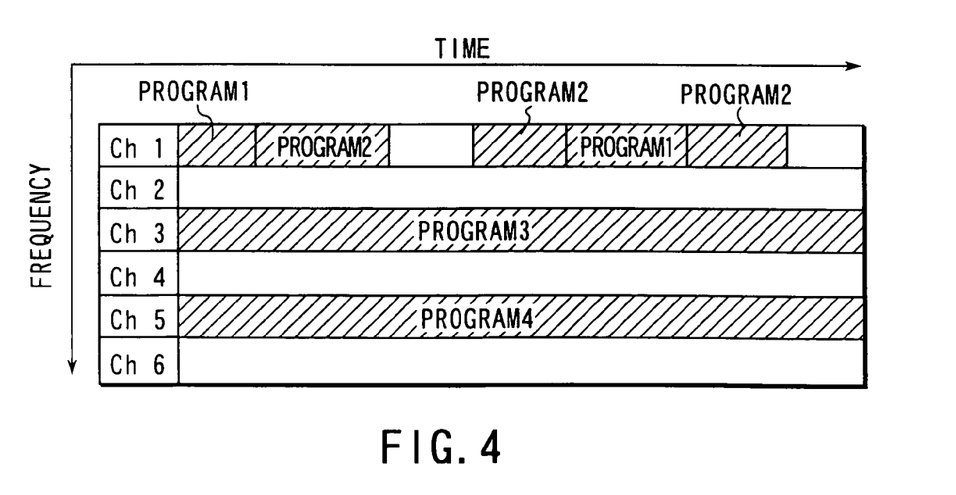
FIG. 4 is a view showing an example of a transmission schedule table.

FIG. 3 is a detailed block diagram showing the video server 1 shown in FIG. 2. In this figure, the video server 1 is comprised of a CPU 11 which controls the entire video server 1, a memory 12 which stores program data or the like, a transmission schedule table 13 for transmitting program data, an external device interface 14 for inputting data from a hard disk drive (HDD) and an external device 17 for Internet or the like, a timer 15, and a transmission interface 16 for transmitting program data and the transmission schedule table 13 to the clients 6. FIG. 4 shows an example of the transmission schedule table 13. As shown in FIG. 4, a plurality of program data items are multiplexed by the frequency or time. For example, programs 1 and 2 are multiplexed within one same frequency band. Also, programs 1, 2, 3, and 4 are multiplexed on the time axis.

Figure 5:
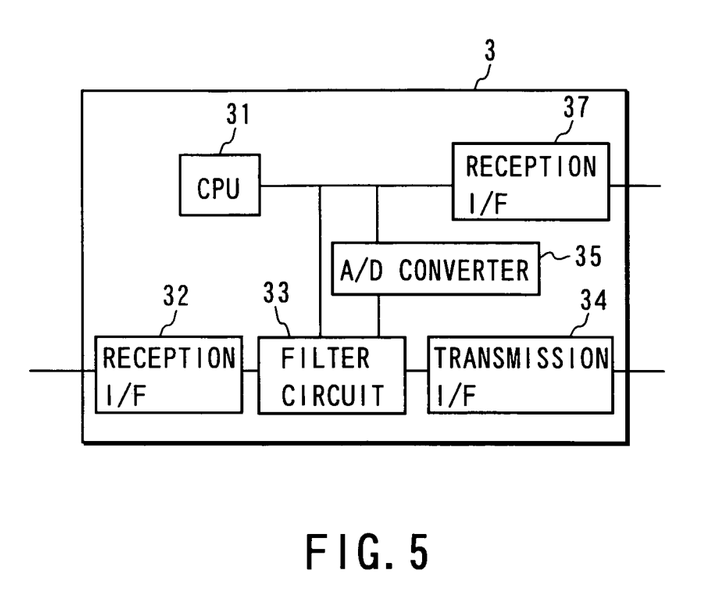
FIG. 5 is a block diagram showing details of a filter unit shown in FIG. 2.

FIG. 5 is a detailed block diagram showing the filter unit 3 in FIG. 2. As shown in this figure, the filter unit 3 is comprised of a CPU 31 which controls the entire filter unit, a receiving interface (I/F) 32 which receives program data and transmission schedule table data transmitted from the video server 1, a filter circuit 33 which is connected with the reception I/F 32 and the CPU 31 and which filters program data based on controls by the CPU 31, a transmission interface (I/F) 34 for transmitting program data outputted from the filter circuit 33, a reception interface (I/F) 37 for receiving information concerning a program transmitted from the clients 6, and an A/D converter 35 for analog-to-digital-converting the transmission schedule table 13 received through the reception I/F 32 and the filter circuit 33.

Figure 6:
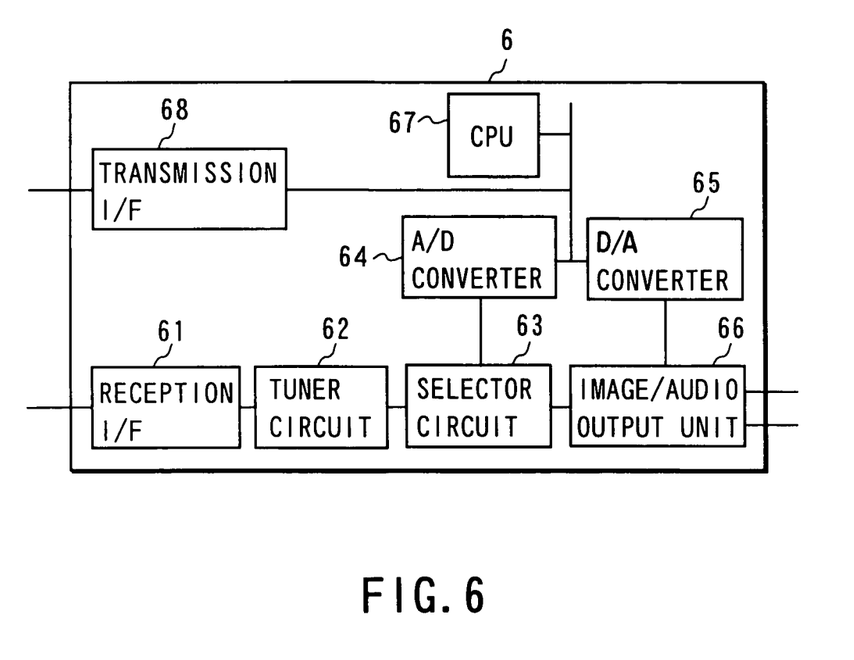
FIG. 6 is a block diagram showing details of a client shown in FIG. 2.

FIG. 6 is a detailed block diagram showing the client 6 shown in FIG. 2. As shown in this figure, the client 6 is comprised of a reception interface (I/F) 61 for receiving program data transmitted from a filter unit 3, a tuner circuit 62 for making synchronization with the band frequency of program data received through the reception I/F 61, a selector circuit 63 for distributing received program data to an A/D converter circuit 64 or an image/audio output device 66 depending on whether or not the received program data is compressed, the analog-to-digital (A/D) converter circuit 64 for analog-to-digital-converting compressed data distributed by the selector circuit 63, a CPU 67 for controlling the entire client 6 and expanding compressed data subjected to digital conversion by the A/D converter 64, a D/A converter 65 for digital-to-analog-converting program data expanded by the CPU 67, an image/audio output device 66 for outputting program data outputted from the D/A converter 65 further to the outside, and a transmission interface (I/F) 68 for transmitting information concerning a program which any of the clients 6 currently receives.

In the following, operation of the communication system according to the present invention constructed as described above. The video server 1 sends a plurality of program data items multiplexed by the frequency and time to the filter units 3. Each filter unit 3 receives the plurality of program data items transmitted from the video server 1 through the reception I/F 32, and transmits them to the clients 6 through the transmission I/F 34. Each client 6 outputs the plurality of program data items transmitted from the filter units 3 to an external device such as a monitor or the like through the reception I/F 61, the tuner circuit 62, the selector circuit 63, and the image/audio output device 66.

Next, the video server 1 prepares a transmission schedule table as shown in FIG. 4, in correspondence with data to be transmitted, and sends it to each filter unit 3 through the transmission I/F 16 and a transmission line 2. Each filter unit 3 receive the transmission schedule table 13 through the reception I/F 32. The received transmission schedule table 13 is supplied to the A/D converter 35 through the filter circuit 33 so that analog data is converted into digital data. The converted digital transmission schedule table 13 is taken in by the CPU 31. Meanwhile, the CPU 67 of the client 6 transmits program information which the client 6 itself is currently receiving, to the filter unit 3 through the transmission I/F 68. The filter unit 3 receives this program information through the reception I/F 37 and takes it in into the CPU 31.

Figure 7:
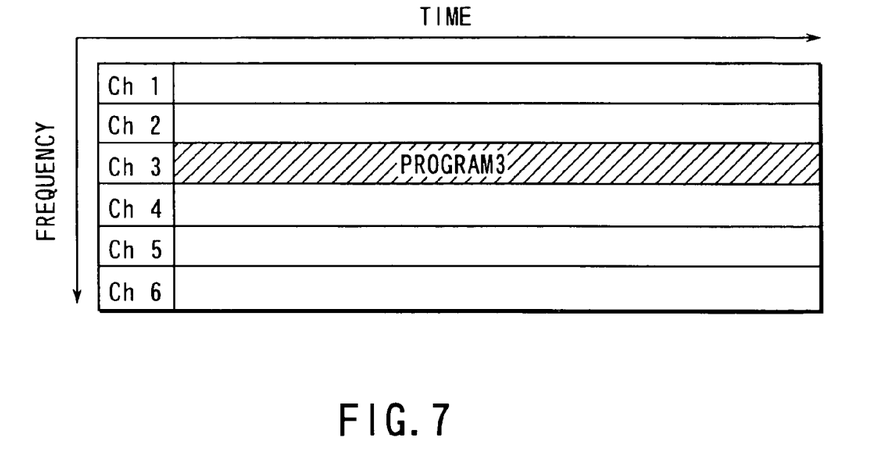
FIG. 7 is a view showing an example of a transmission schedule table after filtering the transmission schedule table shown in FIG. 4.
Figure 8:
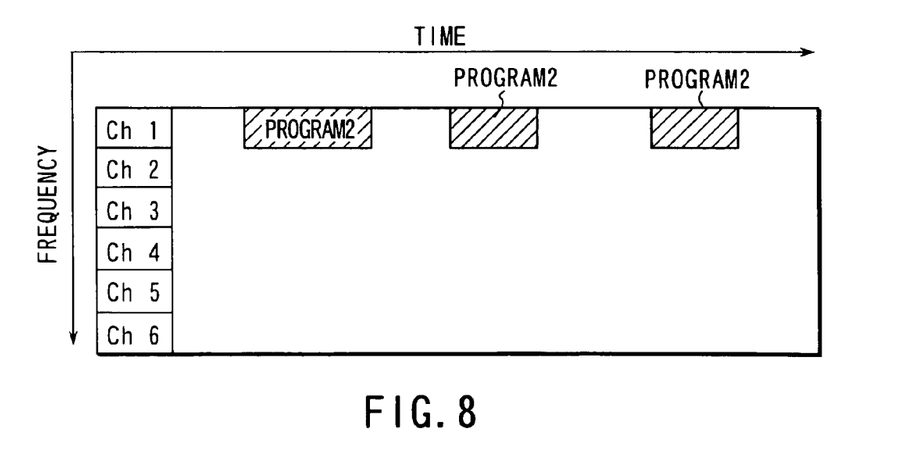
FIG. 8 is a view showing an example of a transmission schedule table after filtering the transmission schedule table shown in FIG. 4.

Next, the video server 1 transmits program data multiplexed by the frequency and time. Each filter unit 3 takes in the multiplexed program data through the reception I/F 32. The CPU 31 controls the characteristic of the filter circuit 33 on the basis of the transmission schedule table and the program information transmitted from the client 6 such that target program information is extracted. The filter circuit 33 filters the program data supplied from the reception I/F on the basis of the filtering characteristic controlled by the CPU 31. Therefore, in case of program data like the channel 3 shown in FIG. 4 which is not multiplexed by the frequency, for example, only the data of the program 3 passes through the filter as a result of filtering, as shown in FIG. 7, and the other data is interrupted. In case of program data like the channel 1 shown in FIG. 4, for example, only the program 2 passes as shown in FIG. 8, and the other program data is interrupted.

Next, the second embodiment of the present invention will be explained.

Figure 9:
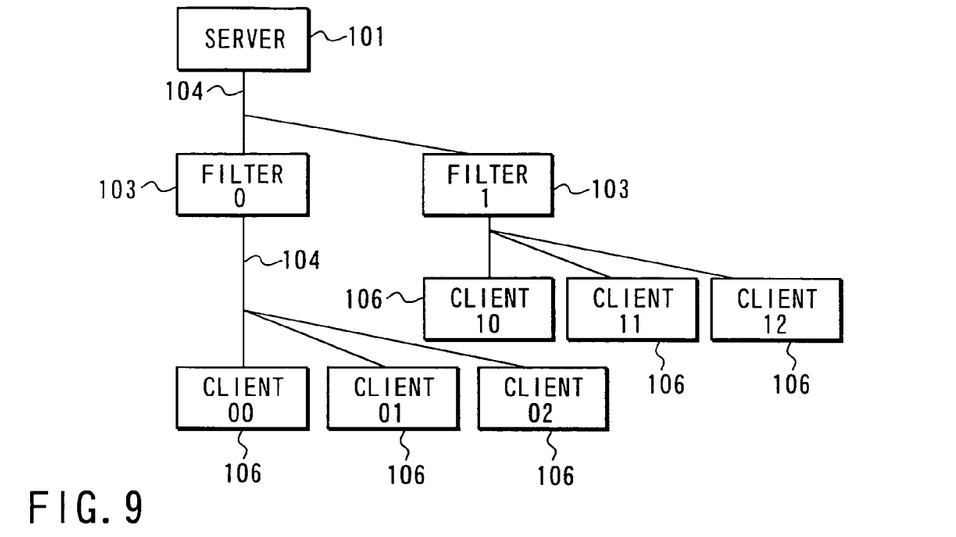
FIG. 9 is a block diagram showing a second embodiment of a video server system according to the present invention.

FIG. 9 is a block diagram showing the second embodiment of the communication system according to the present invention. As shown in this figure, the video server 101 and the filter units 103, as well as the filter units 103 and the clients 106, are connected to each other by RF cables 104 represented by coaxial cables for CATV, so that bi-directional data transfer can be achieved. Each of the video server 101 and the clients 106 has a transmission/reception function. The clients 106 transfer data to the server 101 with use of the same RF cables 104.

In the present embodiment, data which flows from the server 101 to the clients 106 is called downstream data, and data which reversely flows from the clients 106 to the server 101 is called upstream data.

Figure 10:
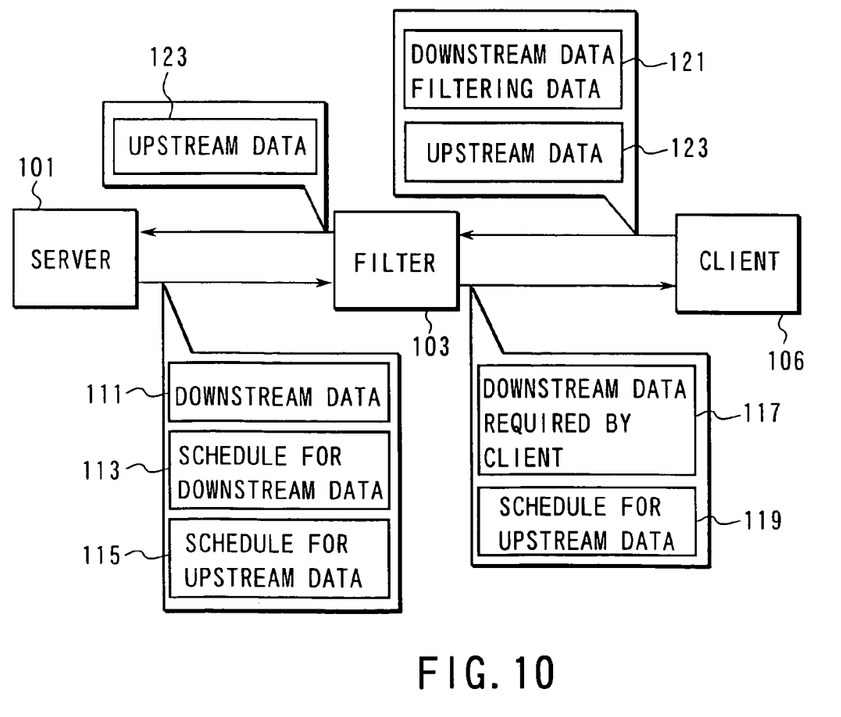
FIG. 10 is a view illustrating data flowing between a server, a filter, and a client in the second embodiment.

FIG. 10 shows the flow of data between the server 101, a filter 103, and a client 106. As shown in this figure, downstream data 111, a downstream data schedule 113, and an upstream data schedule 115 are transmitted from the server 101 to the filter 103. The downstream data 111 is Internet data or the like for program data and clients. In the present embodiment, all programs and data for clients are multiplexed by the frequency and time. The downstream data schedule 113 is to specify the contents of downstream data by the frequency and time. Further, the upstream data schedule data 115 indicates a table showing upstream data transmission timings assigned to respective clients 106.

Also, downstream data 117 required by the client 106 and upstream data schedule 119 are transmitted from the filter 103 to the client 106. The downstream data 117 required by the client 106 indicates data obtained by allowing only the data selected by each client 106 to pass.

Also, data transmitted from the client 106 to the filter 103 are downstream data filtering information 121 and upstream data 123. The downstream data filtering information 121 is information concerning programs is to be received from now and necessary data, which are used for filtering downstream data. For example, if the client 106 is a normal TV apparatus, the downstream data filtering information 121 is information indicating which channel has been selected. Also, the upstream data 123 indicates upstream data transmitted from each client, based on the upstream schedule.

Also, upstream data 123 is transmitted from the filter 103 to the server 101. When upstream data does not flow, the filter 103 executes filtering in accordance with a schedule for upstream data, which is supplied from the server 101, so that noise or unnecessary signals might not flow in the direction from the client 106 to the server 101.

Figure 11:
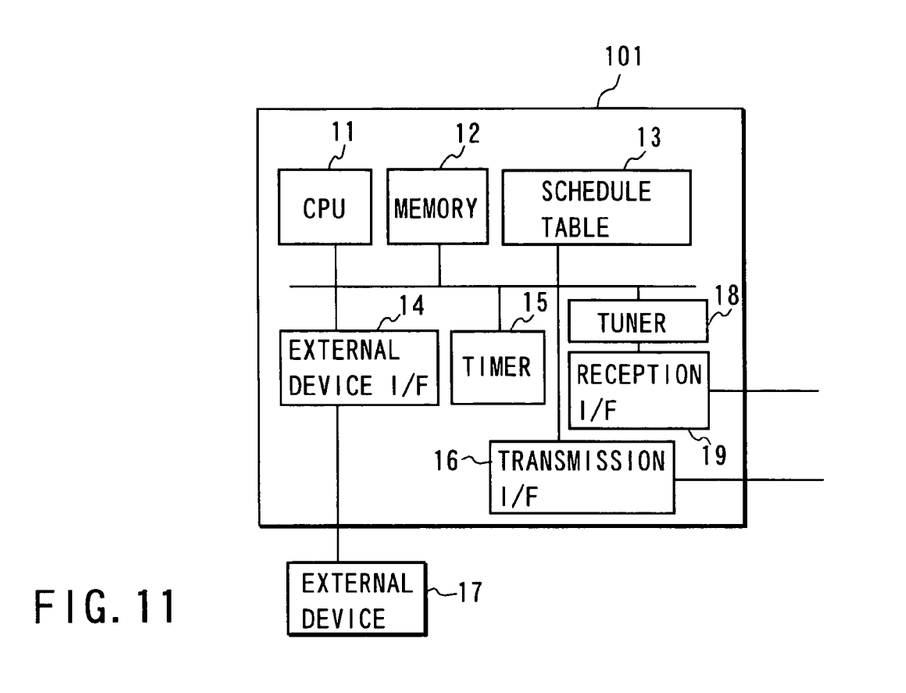
FIG. 11 is a detailed block diagram showing the server shown in FIG. 9.

FIG. 11 is a detailed block diagram of the server 101. The same parts as those of the first embodiment will be denoted at the same reference symbols as those of the first embodiment, and explanation thereof will be omitted herefrom. Upstream data is received by the reception I/F 19 and is outputted, as digital data separated by the tuner 18, to the external device I/F 14. If upstream data is destined to the server 101, the upstream data is used within the server 101.

Figure 12:
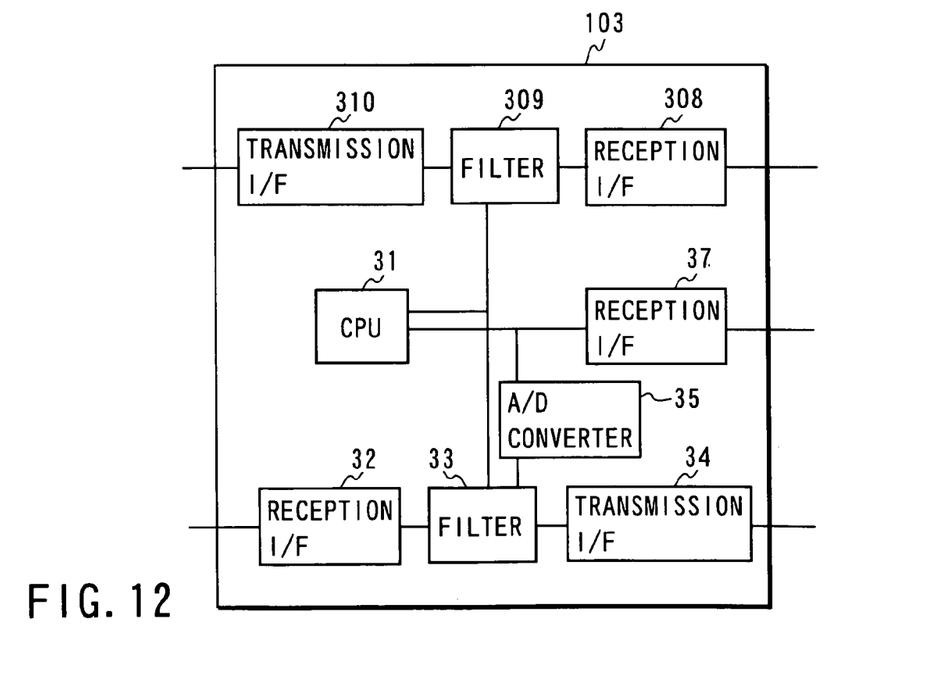
FIG. 12 is a detailed block diagram showing the filter shown in FIG. 9.

FIG. 12 is a detailed block diagram showing the filter 103. The same parts as those of the first embodiment will be denoted at the same reference as those of the first embodiment, and detailed explanation thereof will be omitted herefrom. As shown in this figure, the filter 103 includes a filter 309 for upstream data, a reception I/F 308, and a transmission I/F 310, in addition to components forming the structure of the filter according to the first embodiment shown in FIG. 5. The upstream filter 309 is controlled so as to carry out data reception in the same procedure as that of the schedule for downstream data. Information for filtering downstream data is not received through an RF cable but is received through another telephone line or LAN by the reception I/F 37 and is supplied to the CPU 31. Based on this filtering information and schedule data, the CPU 31 executes filtering on downstream data.

Figure 13:
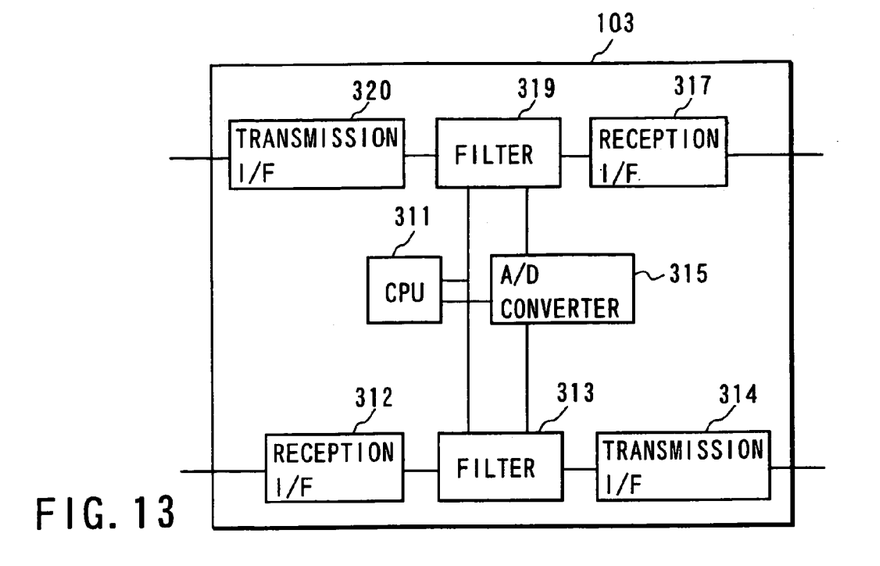
FIG. 13 is a detailed block diagram showing the client shown in FIG. 9.

FIG. 13 is a detailed block diagram showing another structure of the filter 103. In this case, an RF cable is used for information concerning filtering of downstream data, like the case of upstream data. Filtering information is extracted from data from the client 106 and is taken in by the CPU 311 through a reception I/F 317, a filter 319, and an A/D converter 315. Based on the filtering information, the filter 313 for downstream data is controlled.

Figure 14A:
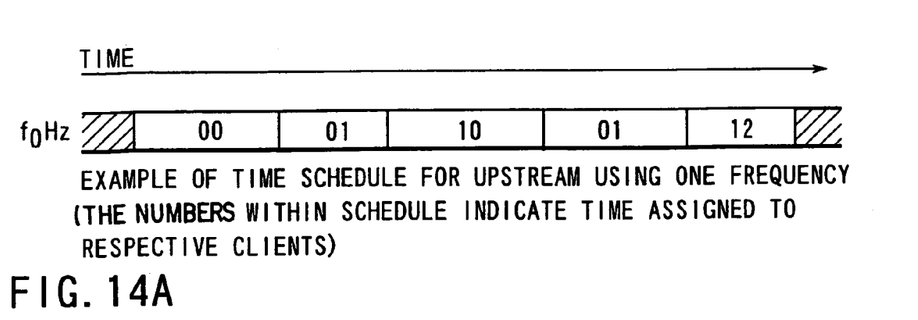
FIGS. 14A to 14C are views showing an operation example of a filter in case where only one frequency is used.
Figure 14B:
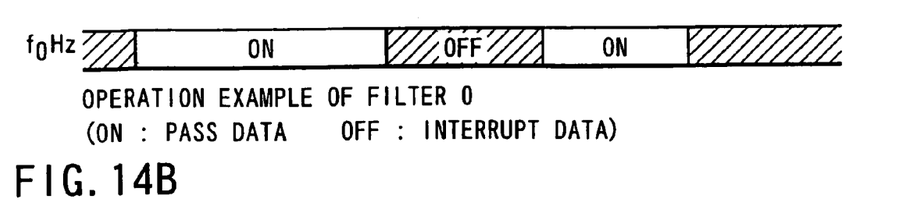
Figure 14C:
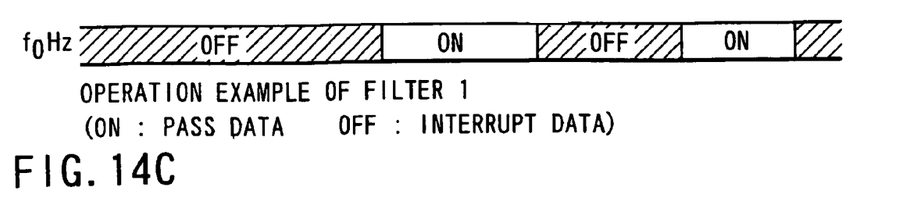

FIGS. 14A to 14C show a schedule where one frequency is used and a state of filtering of upstream data based on the schedule. The numbers assigned to clients and filters are the same as those shown in FIG. 8. FIG. 14A is an example of a time schedule in the upstream direction, using one frequency. The numbers in the schedule are times assigned to respective clients 106. FIG. 14B shows an operation example of the filter 0. FIG. 14C shows an operation example of the filter 1. In both examples, ON means that data is allowed to pass, and OFF means that data is interrupted. As shown in these figures, interference is avoided between different filters so that alteration of data can be avoided. However, for example, if an influence from noise, reflection, or the like caused by the client 00 overlaps the timing when a signal outputted from the client 01, destruction of data of the client 01 cannot be avoided.

Figure 15A:
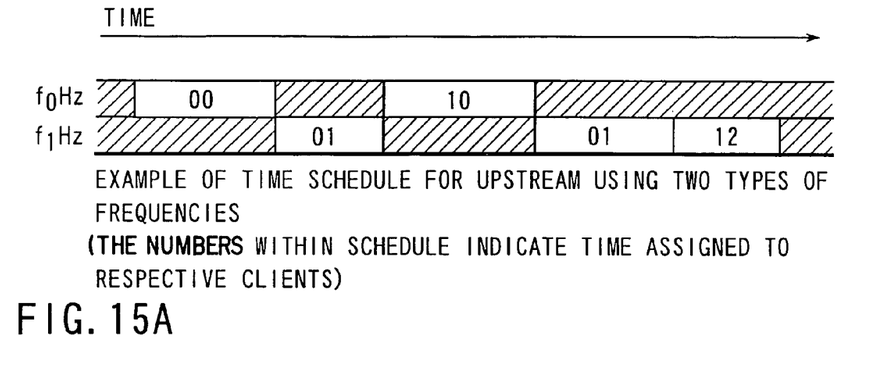
FIGS. 15A to 15C are views showing an operation example of a filter in case where two frequencies are used.
Figure 15B:
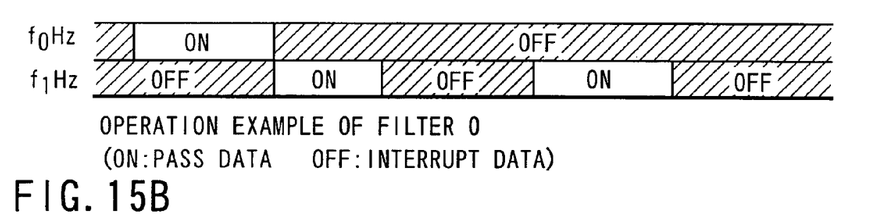
Figure 15C:
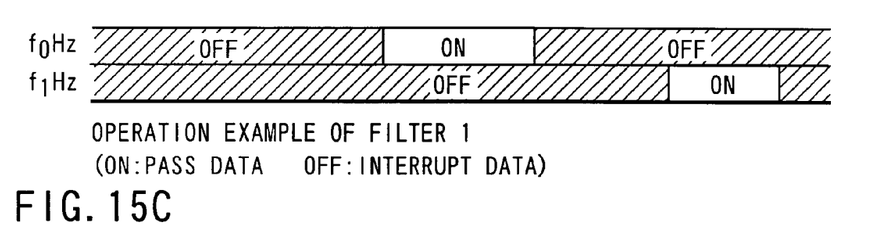

FIG. 15A shows operation of the filter 103 with respect to upstream data when two frequencies are used. FIG. 15A shows an example of a time schedule using two frequencies. Note that the numbers in the schedule. indicate times assigned to respective clients. FIG. 15B shows an operation example of the filter 0, and FIG. 15C shows an operation example of the filter 1. ON means that data is allowed to pass, and OFF means that data is interrupted.

Suppose that clients 00 and 01 are connected to a filter 0 and clients 10 and 12 are connected to a filter 1. Also, suppose that the clients 00 and 10 are assigned to a frequency f0 Hz and the clients 01 and 12 are assigned to a frequency f1 Hz.

In this embodiment, a plurality of frequencies are used so that clients connected to one same filter can be prevented from interfering each other. That is, it is possible to avoid interference that noise, reflection waves, or the like caused by the client 00 overlaps a timing taken by the client 01. Even if the client 00 erroneously outputs a signal within a band other than the frequency f0, interference can be avoided and alteration of data can be prevented as long as the frequency f1 is determined so as to avoid it.

Next, data for controlling upstream data will be explained.

Figure 16:
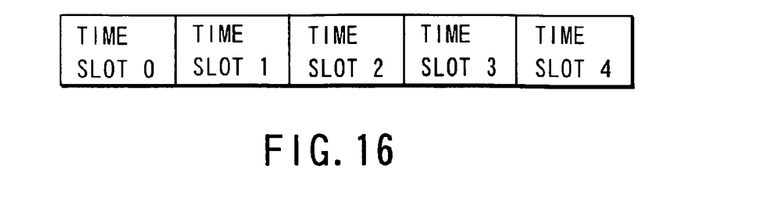
FIG. 16 is a view illustrating an example of time slots.

The server 101 transmits a schedule for upstream data to the filters 103 and clients 106 at a predetermined interval. The time when scheduling is carried out is called a time slot. FIG. 16 shows an example of time slots.

A schedule for upstream data, which is transmitted by the server 101 at a time slot 1, includes the followings.

a) Information (schedule data) at the time slot 2, concerning times and frequencies assigned to respective clients.

b) Schedule data at the time slot 3 for transmitting request data in order to receive assigned times which clients request. This schedule data is assigned to all clients. At this timing, the clients 106 request data sizes which the clients 106 desire to transmit at the time slot 3.

c) When downstream filtering information is transmitted through an RF cable 104, the clients assigns times and frequencies for transmitting filtering information to the filter, at the time slot 2.

Meanwhile, the clients 106 transmit the following data at the time slot 1.

d) Data to be transmitted originally through severs 101 to the Internet.

d) A size of upstream data which the clients 106 desire to transmit at the time slot 3.

e) Filtering information of downstream data which the clients desire to receive at the time slot 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system comprising:
a first transmitting/receiving apparatus configured to transmit multiplexed program data to be transmitted from the first transmitting/receiving apparatus to a second transmitting/receiving apparatus, first transfer schedule table information indicating a schedule of the program data, and second transfer schedule table information concerning data to be transmitted from the second transmitting/receiving apparatus to the first transmitting/receiving apparatus, to filter means;
the second transmitting/receiving apparatus configured to transmit data to the first transmitting/receiving apparatus, based on the second transfer schedule table information transmitted from the second transmitting/receiving apparatus; and
a filter unit configured to receive the first transfer schedule table information and the second transfer schedule table information transmitted from the first transmitting/receiving apparatus, for filtering data transmitted from the first transmitting/receiving apparatus, based on the first transfer schedule table information, and for filtering data transmitted from the second transmitting/receiving apparatus to the first transmitting/receiving apparatus, based on the second transfer schedule table information,
wherein
the first transmitting/receiving apparatus transmits downstream data transmitted from the first transmitting/receiving apparatus to the second transmitting/receiving apparatus, schedule data which specifies contents of the downstream data by means of frequency and time, and schedule data for upstream data transmitted from the second transmitting/receiving apparatus to the first transmitting/receiving apparatus,
the filter unit transmits the schedule data for the downstream data and that for the upstream data requested by the second transmitting/receiving apparatus, to the second transmitting/receiving apparatus, and transmits the upstream data to the first transmitting/receiving apparatus.
the second transmitting/receiving apparatus transmits the upstream data and information for filtering the downstream data by the filter unit, to the filter unit, and
the filter unit comprises:
a CPU for controlling entirely the filter unit;
a first reception interface for receiving transmitted data and schedule data from the first transmitting/receiving apparatus;
a first filter circuit connected with the CPU and the first reception interface, to filter downstream data, based on control by the CPU;
a first transmission interface for transmitting data outputted from the first filter circuit;
a second reception interface for receiving data transmitted from the second transmitting/receiving apparatus;
an A/D converter for analog-to-digital-converting transmission schedule data received through the first reception interface and the first filter circuit;

a third reception interface for receiving the upstream data;
a second filter circuit for filtering upstream data received through the third reception interface; and
a second transmission interface for transmitting upstream data filtered by the second filter circuit, to the first transmitting/receiving apparatus, wherein
the second filter circuit is controlled so as to receive data in a procedure which is the same as that taken for receiving the schedule data for downstream data, and
the second reception interface receives the upstream data through a route different from a route through which the first reception interface receives the transmitted data and the schedule data from the first transmitting/receiving apparatus.

2. A communication system comprising:
a first transmitting/receiving apparatus configured to transmit multiplexed program data to be transmitted from the first transmitting/receiving apparatus to a second transmitting/receiving apparatus, first transfer schedule table information indicating a schedule of the program data, and second transfer schedule table information concerning data to be transmitted from the second transmitting/receiving apparatus to the first transmitting/receiving apparatus, to filter means;
the second transmitting/receiving apparatus configured to transmit data to the first transmitting/receiving apparatus, based on the second transfer schedule table information transmitted from the second transmitting/receiving apparatus; and
a filter unit configured to receive the first transfer schedule table information and the second transfer schedule table information transmitted from the first transmitting/receiving apparatus, for filtering data transmitted from the first transmitting/ receiving apparatus, based on the first transfer schedule table information, and for filtering data transmitted from the second transmitting/receiving apparatus to the first transmitting/receiving apparatus, based on the second transfer schedule table information,
wherein
the first transmitting/receiving apparatus transmits downstream data transmitted from the first transmitting/receiving apparatus to the second transmitting/receiving apparatus, schedule data which specifies contents of the downstream data by means of frequency and time, and schedule data for upstream data transmitted from the second transmitting/receiving apparatus to the first transmitting/receiving apparatus,
the filter unit transmits the schedule data for the downstream data and that for the upstream data requested by the second transmitting/receiving apparatus, to the second transmitting/receiving apparatus, and transmits the upstream data to the first transmitting/receiving apparatus,
the second transmitting/receiving apparatus transmits the upstream data and information for filtering the downstream data by the filter unit, to the filter unit, and
the filter unit comprises:
a CPU for controlling entirely the filter unit;
a first reception interface for receiving transmitted data and schedule data from the first transmitting/receiving apparatus;
a first filter circuit connected with the CPU and the first reception interface, to filter downstream data, based on control by the CPU;
a first transmission interface for transmitting data outputted from the first filter circuit;

a second reception interface for receiving the upstream data and information for filtering downstream data;
a second filter circuit for filtering upstream data received through the second reception interface;
a second transmission interface for transmitting upstream data filtered by the second filter circuit, to the first transmitting/receiving apparatus; and
an A/D converter for analog-to-digital-converting data from the second transmitting/receiving apparatus received through the second reception interface and the second filter circuit, wherein
information for filtering downstream data which the second reception interface receives and upstream data which the first reception interface receives are received through one same route.

3. A communication system comprising:
a first transmitting/receiving apparatus configured to transmit multiplexed program data to be transmitted from the first transmitting/receiving apparatus to a second transmitting/receiving apparatus, first transfer schedule table information indicating a schedule of the program data, and second transfer schedule table information concerning data to be transmitted from the second transmitting/receiving apparatus to the first transmitting/receiving apparatus, to filter means;
the second transmitting/receiving apparatus configured to transmit data to the first transmitting/receiving apparatus, based on the second transfer schedule table information transmitted from the second transmitting/receiving apparatus; and
a filter unit configured to receive the first transfer schedule table information and the second transfer schedule table information transmitted from the first transmitting/receiving apparatus, for filtering data transmitted from the first transmitting/receiving apparatus, based on the first transfer schedule table information, and for filtering data transmitted from the second transmitting/receiving apparatus to the first transmitting/receiving apparatus, based on the second transfer schedule table information,
wherein
the first transmitting/receiving apparatus transmits downstream data transmitted from the first transmitting/receiving apparatus to the second transmitting/receiving apparatus, schedule data which specifies contents of the downstream data by means of frequency and time, and schedule data for upstream data transmitted from the second transmitting/receiving apparatus to the first transmitting/receiving apparatus,
the filter unit transmits the schedule data for the downstream data and that for the upstream data requested by the second transmitting/receiving apparatus, to the second transmitting/receiving apparatus, and transmits the upstream data to the first transmitting/receiving apparatus,
the second transmitting/receiving apparatus transmits the upstream data and information for filtering the downstream data by the filter unit, to the filter unit, and,
in a time slot, schedule data for upstream data, which the first transmitting/receiving apparatus transmits, includes information concerning time and frequency assigned to the second transmitting/receiving apparatus, schedule data for transmitting request data for receiving an assigned time which the second transmitting/receiving apparatus requests, and time and frequency at which the second transmitting/receiving apparatus transmits filter information for the filter unit, and in the same time slot, data transmitted from the second transmitting/receiving apparatus to the first transmitting/receiving apparatus includes data transmitted to the first transmitting/receiving apparatus, size of upstream data to be transmitted, and filtering information concerning received downstream data.

* * * * *